US012245091B2

(12) United States Patent
Kang (10) Patent No.: US 12,245,091 B2
(45) Date of Patent: Mar. 4, 2025

(54) METHOD FOR TRANSMITTING RADIO CAPABILITY IDENTIFIER, TERMINAL DEVICE, AND NETWORK NODE

(71) Applicant: VIVO MOBILE COMMUNICATION CO., LTD., Guangdong (CN)

(72) Inventor: Yanchao Kang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 211 days.

(21) Appl. No.: 17/691,629

(22) Filed: Mar. 10, 2022

(65) Prior Publication Data

US 2022/0201571 A1 Jun. 23, 2022

Related U.S. Application Data

(63) Continuation of application No. PCT/CN2020/115901, filed on Sep. 17, 2020.

(30) Foreign Application Priority Data

Sep. 19, 2019 (CN) .......................... 201910888742.5

(51) Int. Cl.
*H04W 36/00* (2009.01)
*H04W 36/14* (2009.01)
*H04W 60/04* (2009.01)
*H04W 84/04* (2009.01)

(52) U.S. Cl.
CPC ..... *H04W 36/00837* (2018.08); *H04W 36/14* (2013.01); *H04W 60/04* (2013.01); *H04W 84/042* (2013.01)

(58) Field of Classification Search
CPC ........... H04W 36/00837; H04W 36/14; H04W 60/04; H04W 84/042; H04W 8/245; H04W 8/24; H04W 24/02; H04W 8/02; H04L 5/0053
See application file for complete search history.

(56) References Cited

U.S. PATENT DOCUMENTS

2019/0327653 A1 10/2019 Jin et al.
2020/0351646 A1* 11/2020 Casati ................. H04L 41/0661
2020/0351762 A1* 11/2020 Casati ................... H04W 60/04
2020/0367149 A1 11/2020 Kang et al.

FOREIGN PATENT DOCUMENTS

CN 101489218 A 7/2009
CN 103108367 A 5/2013
CN 2015013038 A1 1/2015
(Continued)

OTHER PUBLICATIONS

Qualcomm Inc., "Adding general description of RACS", 3GPP TSG-CT WG1 Meeting #119, C1-194402, Wroclaw (Poland), Aug. 26-30, 2019.
(Continued)

*Primary Examiner* — Marisol Figueroa
(74) *Attorney, Agent, or Firm* — Price Heneveld LLP (57) ABSTRACT

A method for transmitting a radio capability identifier, a terminal device, and a network node are disclosed. The method includes: sending a currently available first radio capability identifier of a terminal device to a network node in a case that a network node change-related condition is satisfied.

20 Claims, 2 Drawing Sheets

(56) References Cited

FOREIGN PATENT DOCUMENTS

| CN | 106304019 A | 1/2017 |
| CN | 108476444 A | 8/2018 |
| CN | 109587678 A | 4/2019 |
| CN | 109803347 A | 5/2019 |
| CN | 111182563 A | 5/2020 |

OTHER PUBLICATIONS

OPPO, Discussion on NB-IoT and WB-EUTAN capabilities, RACS/Rel-16, SA WG2 Meeting #134, Jun. 24-28, 2019, Reno, USA.

Qualcomm Incorporated, Ericsson, ZTE, China Mobile, Signalling of UE support for RACS and of UE radio capability ID, 3GPP TSG-CT WG1 Meeting #119, C1-194947, (was C1-194403), Aug. 26-30, 2019, Wroclaw, Poland.

Intel Corporation, Discussion on the interpretation of NW assigned capability ID, 3GPP TSG-RAN WG2 meeting #107, R2-1910455, (revision of R2-1906344), Aug. 26-30, 2019, Prague, Czech.

CATT, Mediatek Inc., Considerations on RAN3 impact for RACS, 3GPP TSG-RAN WG3 #105, R3-193476, Aug. 26-Aug. 30, 2019, Ljubljana, Slovenia.

Sprint Corporation, Aligning Create Session Request parameters with 29.274, 3GPP TSG-SA2 Meeting #134, S2-1907094, Jun. 24, 2019-Jun. 28, 2019, Sapporo, Japan.

Qualcomm Incorporated, Handing of NB-IoT radio capabilities and RACS in 5GS, 3GPP TSG-SA WG2 Meeting #134, S2-1907173, Jun. 24-28, 2019, Sapporo, Japan.

Mediatek Inc., "Correction to deletion of PLMN-assigned UE Radio Capability ID", 3GPP TSG SA2 Meeting #134, S2-1907339, Sapporo, Japan, Jun. 24-28, 2019.

CATT, "RAN SPEC Impact Analysis for RACS Feature", 3GPP TSG-RAN WG2 Meeting #107, R2-1909919, Prague, Czech Republic, Aug. 26-30, 2019.

Ericsson, "UE storage of RACS ID and mapping to UE radio capability configuration", 3GPP TSG CT WG1 Meeting #119, C1-194426, Wroclaw (Poland), Aug. 26-30, 2019.

Ericsson, "RACS ID signalling in NAS and related handling", 3GPP TSG CT WG1 Meeting #119, C1-194425, Wroclaw (Poland), Aug. 26-30, 2019.

* cited by examiner

METHOD FOR TRANSMITTING RADIO CAPABILITY IDENTIFIER, TERMINAL DEVICE, AND NETWORK NODE

CROSS-REFERENCE TO RELATED APPLICATIONS

This application is a continuation application of PCT International Application No. PCT/CN2020/115901 filed on Sep. 17, 2020, which claims priority to Chinese Patent Application No. 201910888742.5, filed in China on Sep. 19, 2019, the entire content of which are hereby incorporated by reference in their entireties.

TECHNICAL FIELD

The present disclosure relates to the field of communication technologies, and in particular, to a method for transmitting a radio capability identifier, a terminal device, and a network node.

BACKGROUND

Radio capability signaling optimization (RACS) is an optional optimization feature for both terminal devices and networks that is introduced by the 3rd Generation Partnership Project (3GPP) Release 16 (Rel16), and aims to optimize the terminal radio capability transmission signaling on an air interface. Its working mechanism is to use a user equipment (UE) (also referred to as a terminal device) radio capability identifier to replace a currently activated radio capability of a UE. The UE radio capability identifier may be allocated by the operator network or by the terminal manufacturer.

In related technologies, a UE supporting RACS needs to provide a network with an indication of its capability of supporting RACS, while a network supporting RACS does not need to provide a UE with an indication of its capability of supporting RACS. Specifically, if the UE supporting RACS has an available UE radio capability identifier, the UE provides a current UE radio capability identifier of the UE to the network in a registration request message only when the UE initially registers or when the UE capability identifier changes.

However, in practical applications, a network node supporting RACS and a network node not supporting RACS may coexist. When a UE moves between a network node not supporting RACS and a network node supporting RACS, the radio capability of the UE may change, which leads to a mismatch between UE radio capability identifiers on the UE side and the network node side, affecting the normal communication between the UE and the network.

SUMMARY

Embodiments of the present disclosure provide a method for transmitting a radio capability identifier, a terminal device, and a network node, to solve the problem of a mismatch between UE radio capability identifiers on the UE side and the network node side when the UE moves between a network node not supporting RACS and a network node supporting RACS in related technologies.

To solve the above-mentioned technical problems, the present disclosure is implemented as follows:

According to a first aspect, the embodiments of the present disclosure provide a method for transmitting a radio capability identifier, which is applicable to a terminal device, where the terminal device supports radio capability signaling optimization RACS, the method including:
sending a currently available first radio capability identifier of a terminal device to a network node in a case that a network node change-related condition is satisfied.

According to a second aspect, the embodiments of the present disclosure further provide a method for transmitting a radio capability identifier, applicable to a network node, where the network node is a first network node, and the first network node supports RACS, the method including:
sending a third radio capability identifier to a terminal device in a case that the terminal device supports RACS and a second network node does not support RACS,
where the third radio capability identifier matches a current radio capability of the terminal device.

According to a third aspect, the embodiments of the present disclosure further provide a terminal device, where the terminal device supports radio capability signaling optimization RACS, the terminal device including:
a sending module, configured to send a currently available first radio capability identifier of a terminal device to a network node in a case that a network node change-related condition is satisfied.

According to a fourth aspect, the embodiments of the present disclosure further provide a network node, where the network node is a first network node, and the target-side network node supports RACS, the first network node including:
a first sending module, configured to send a third radio capability identifier to a terminal device in a case that the terminal device supports RACS and a second network node does not support RACS,
where the third radio capability identifier matches a current radio capability of the terminal device.

According to a fifth aspect, the embodiments of the present disclosure further provide a terminal device, including a processor, a memory, and a computer program stored in the memory and executable by the processor, where the computer program, when executed by the processor, implements the steps of the method for transmitting a radio capability identifier provided according to the first aspect.

According to a sixth aspect, the embodiments of the present disclosure further provide a network node, including a processor, a memory, and a computer program stored in the memory and executable by the processor, where the computer program, when executed by the processor, implements the steps of the method for transmitting a radio capability identifier provided according to the second aspect.

According to a seventh aspect, the embodiments of the present disclosure further provide a computer-readable storage medium, storing a computer program, where the computer program, when executed by a processor, implements the steps of the method for transmitting a radio capability identifier provided according to the first aspect or implements the steps of the method for transmitting a radio capability identifier provided according to the second aspect.

In the embodiments of the present disclosure, by sending a currently available first radio capability identifier of a terminal device to a network node in a case that a network node change-related condition is satisfied, the problem of a mismatch between UE radio capability identifiers on the UE side and the network node side when the UE moves between a network node not supporting RACS and a network node supporting RACS can be solved, thereby ensuring normal communication between the UE and the network node.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

The specification and claims of this application, and terms "first" and "second" are used to distinguish similar objects, but are unnecessarily used to describe a specific sequence or order. It may be understood that the data used in such a way is interchangeable in proper circumstances, so that the embodiments of this application described herein can be implemented in other sequences than the sequence illustrated or described herein. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device. In addition, the use of "and/or" in the description and the claims means at least one of the connected objects, for example, 7 conditions such as A and/or B and/or C, indicating including A alone, B alone, C alone, and both A and B present, B and C present, A and C present, and A, B, and C all present.

Figure 1:
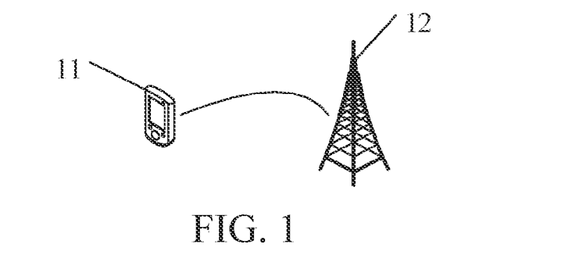
FIG. 1 is a structural diagram of a network system to which the embodiments of the present disclosure can be applied.

The embodiments of the present disclosure provide a method for transmitting a radio capability identifier. Referring to FIG. 1, FIG. 1 is a structural diagram of a network system to which the embodiments of the present disclosure can be applied. As shown in FIG. 1, the network system includes a terminal device 11 and a network node 12. The terminal device 11 may be a mobile phone, a tablet personal computer, a laptop computer, a personal digital assistant (PDA), a mobile Internet device (MID), a wearable device, or other user-side devices. It is to be noted that the specific type of the terminal device 11 is not limited in the embodiments of the present disclosure. The network node 12 may be a network entity such as an access and mobility management function (AMF) or a mobility management entity (MME). It should be noted that, in the embodiments of the present disclosure, a specific type of the network node 12 is not limited.

Figure 2:
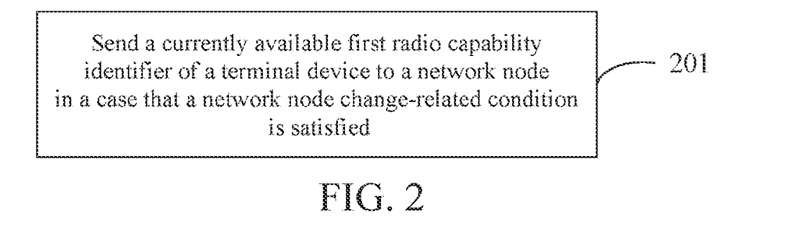
FIG. 2 is a flowchart of a method for transmitting a radio capability identifier according to an embodiment of the present disclosure.

The embodiments of the present disclosure provide a method for transmitting a radio capability identifier, which is applicable to a terminal device, where the terminal device supports radio capability signaling optimization (RACS). Referring to FIG. 2, FIG. 2 is a flowchart of a method for transmitting a radio capability identifier according to an embodiment of the present disclosure. As shown in FIG. 2, the method includes the following steps:

Step 201: Send a currently available first radio capability identifier of a terminal device to a network node in a case that a network node change-related condition is satisfied.

In this embodiment, the network node change-related condition may include a network node change condition and a network node optional-change condition. The network node change condition may be understood as a trigger condition that causes the network node to change, that is, the network node changes in a case that the network node change condition is satisfied.

The network node optional-change condition may be understood as a trigger condition that may cause the network node to change, that is, the network node may or may not change in a case that the network node optional-change condition is satisfied.

The network node may include a network entity such as an AMF or an MME. For example, for a 5th generation (5G) mobile communication system, the network node may be an AMF; for a 4th generation (4G) mobile communication system, the network node may be an MME. It is to be noted that in a case that there is a network node change, the network node may be a first network node.

The first radio capability identifier may be a terminal device radio capability ID, and may be used for indicating a currently available radio capability of a terminal device supporting RACS.

In this embodiment, because the network node change is likely to lead to inconsistency between radio capability identifiers of the network side and the UE, sending a currently available first radio capability identifier of a terminal device to a network node in a case that a network node change-related condition is satisfied can ensure the consistency between UE radio capability identifiers on the terminal device side and the network node side, and alleviate the problem of a mismatch between UE radio capability identifiers on the UE side and the network node side when the UE moves between a network node not supporting RACS and a network node supporting RACS, thereby ensuring normal communication between the UE and the network node.

Optionally, after the terminal device sends the currently available first radio capability identifier of the terminal device to the network node, if the network node supports RACS, the network node may carry a terminal device radio capability identifier in a message to be sent to the terminal device; otherwise, the network node may not carry the terminal device radio capability identifier in the message. For example, the terminal device sends the first radio capability identifier to the network node in a registration request message. If the network node supports RACS, the network node may carry the first radio capability identifier in a registration accept message to be sent to the terminal device; otherwise, the network node does not carry the first radio capability identifier in the registration accept message to be sent to the terminal device. Further, the terminal device may determine whether a network node supports RACS based on whether a message sent by the network node carries the terminal device radio capability identifier, so as to determine whether to enable RACS.

It is to be noted that in a case that the network node supports RACS, the network node may send a radio capability identifier to the terminal device only when a certain condition is met. For example, the network node sends the radio capability identifier to the terminal device in a case that a radio capability identifier received from the terminal device does not match a current radio capability of the terminal device.

Optionally, the foregoing step 201 of sending a currently available first radio capability identifier of a terminal device to a network node may include:

sending the currently available first radio capability identifier of the terminal device to the network node in a first message, where the first message includes one of: a registration request message or a security mode complete message.

In this embodiment, in a case that the network node change-related condition is satisfied, the first radio capability identifier may be sent to the network node in a registration request message, or the first radio capability identifier may be sent to the network node in a security mode complete message.

For example, in a 5G mobile communication system, the first radio capability identifier may be sent to the network node in a registration request message; in a 4G mobile communication system, the first radio capability identifier may be sent to the network node in a security mode complete message.

In this embodiment, signaling and resources can be saved by sending the first radio capability identifier to the network node in the registration request message or the security mode complete message.

Optionally, the network node change-related condition may include, but is not limited to, at least one of the following:

the terminal device moves out of a current tracking area list (Tracking Area List, TA List);

the terminal device performs an inter-system change (i.e., Intersystem Change);

the terminal device selects a new public land mobile network (Public Land Mobile Network, PLMN);

a configuration update command message received by the terminal device from the network node carries a registration request bit with a value of 1;

a security mode command (i.e., Security Mode Command) received from the network node carries a UE radio capability identifier request information element (i.e., UE Radio Capability ID Request IE); or the terminal device initiates a registration update process.

For example, in a case that the terminal device moves out of the current TA List, the terminal device may send the first radio capability identifier to the network node in a registration request message; in a case that the terminal device performs an inter-system change, the terminal device may send the first radio capability identifier to the network node in a registration request message; in a case that the terminal device selects a new PLMN, the terminal device may send the first radio capability identifier to the network node in a registration request message; in a case that a configuration update command message received by the terminal device from the network node carries a registration request bit with a value of 1, the terminal device may send the first radio capability identifier to the network node in a registration request message; in a case that a Security Mode Command received from the network node carries a UE Radio Capability ID Request IE, the terminal device may send the first radio capability identifier to the network node in a security mode complete message; and in a case that the terminal device initiates a registration update process, the terminal device may send the first radio capability identifier to the network node in a registration request message.

Optionally, after the foregoing step 201 of sending a currently available first radio capability identifier of a terminal device to a network node, the method may further include:

receiving a second radio capability identifier sent by the network node, where the second radio capability identifier matches a current radio capability of the terminal device.

In this embodiment, the second radio capability identifier may be the same as the first radio capability identifier, or may be different from the first radio capability identifier. For example, in a case that the first radio capability identifier matches the current radio capability of the terminal device, the second radio capability identifier may be the same as the first radio capability identifier; in a case that the first radio capability identifier does not match the current radio capability of the terminal device, the second radio capability identifier may be different from the first radio capability identifier.

In this embodiment, the terminal device receives, from the network node, the radio capability identifier matching the current radio capability of the terminal device, which not only can ensure that the terminal device radio capability identifiers on the terminal device side and the network node side are consistent, but also can ensure that the terminal device radio capability identifier matches the current radio capability of the terminal device.

Optionally, the receiving a second radio capability identifier sent by the network node may include:

receiving the second radio capability identifier sent by the network node in a second message, where the second message includes one of the following: a registration accept message or a tracking area update (Tracking Area Update, TAU) accept message.

In this embodiment, the second radio capability identifier sent by the network node in the registration accept message may be received, or the second radio capability identifier sent by the network node in the TAU accept message may be received. Specifically, the second message may correspond to the first message. For example, if the first message is a registration request message, the second message may be a registration accept message; if the first message is a security mode complete message, the second message may be a TAU accept message.

In this embodiment, by receiving the second radio capability identifier sent by the network node in the registration accept message or the TAU accept message, signaling and resources for subsequent transmission of terminal capabilities can be saved.

Optionally, the second radio capability identifier may be a radio capability identifier acquired by querying a terminal device capability management function (UE Radio Capability Management Function, UCMF) node.

In this embodiment, the network node may acquire the radio capability identifier matching the current radio capability of the terminal device by querying the UCMF node.

Optionally, the receiving a second radio capability identifier sent by the network node may include:

receiving the second radio capability identifier sent by the network node, in a case that the first radio capability identifier does not match the current radio capability of the terminal device.

In this embodiment, in a case that the first radio capability identifier does not match the current radio capability of the terminal device, the second radio capability identifier is received from the network node, or otherwise, the network node may not send the second radio capability identifier, thereby saving resources.

Figure 3:
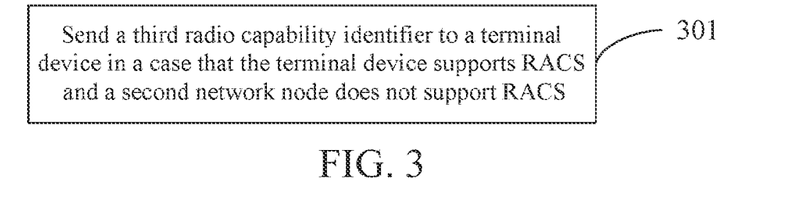
FIG. 3 is a flowchart of a method for transmitting a radio capability identifier according to another embodiment of the present disclosure.

The embodiments of the present disclosure provide a method for transmitting a radio capability identifier, applicable to a network node, where the network node is a first network node, and the first network node supports RACS. Referring to FIG. 3, FIG. 3 is a flowchart of a method for transmitting a radio capability identifier according to an embodiment of the present disclosure. As shown in FIG. 3, the method includes the following steps:

Step 301: Send a third radio capability identifier to a terminal device in a case that the terminal device supports RACS and a second network node does not support RACS,
where the third radio capability identifier matches a current radio capability of the terminal device.

In this embodiment, the first network node may be a new network node, e.g., a network node after moving; and the second network node may be an old network node, e.g., a network node before moving. The first network node and the second network node may both include a network entity such as an AMF or an MME. For example, for a 5G mobile communication system, the first network node and the second network node may both be AMFs; for a 4G mobile communication system, the first network node and the second network node may both be MMEs.

The third radio capability identifier may be a terminal device radio capability identifier matching the current radio capability of the terminal device. Optionally, the current radio capability of the terminal device may be acquired from the second network node, or may be acquired from an access network node.

In practical applications, UE moves from a second network node that does not support RACS to a first network node that supports RACS, and the first network node may acquire a UE radio capability identifier previously allocated to the UE from a UCMF. Because the radio capability of the UE may be changed when the UE is attached to the network node that does not support RACS, a mismatch between current UE radio capability identifiers on the UE side and the first network node side is caused.

In this embodiment, in a case that a terminal device supports RACS and a second network node does not support RACS, a first network node sends a radio capability identifier matching a current radio capability of the terminal device to the terminal device, which can ensure the consistency between UE radio capability identifiers on the terminal device side and the network node side, and solve the problem of a mismatch between UE radio capability identifiers on the UE side and the network node side when the UE moves between a network node not supporting RACS and a network node supporting RACS, thereby ensuring normal communication between the UE and the network node.

Optionally, the foregoing step 301 of sending a third radio capability identifier to a terminal device may include:

sending the third radio capability identifier to the terminal device in a third message,
where the third message includes one of: a registration accept message or a tracking area update TAU accept message.

In this embodiment, the first network node may send the third radio capability identifier to the terminal device in a registration accept message, or may send the third radio capability identifier to the terminal device in a TAU accept message.

For example, in a 5G mobile communication system, the third radio capability identifier may be sent to the terminal device in a registration accept message; in a 4G mobile communication system, the third radio capability identifier may be sent to the terminal device in a TAU accept message.

In this embodiment, by sending the third radio capability identifier to the terminal device in the registration accept message or the TAU accept message, signaling and resources for subsequent transmission of terminal capabilities can be saved.

Optionally, the third radio capability identifier is a radio capability identifier acquired by querying a UE capability management function UCMF node.

In this embodiment, the network node may acquire the radio capability identifier matching the current radio capability of the terminal device by querying the UCMF node.

Optionally, a condition for determining that the second network node does not support RACS may include, but is not limited to, at least one of the following:

a radio capability identifier of the terminal device is not included in a context, where the context is a context of the terminal device acquired from the second network node; or the first network node determines, based on network configuration information, that the second network node does not support RACS.

In this embodiment, the first network node may determine that the second network node does not support RACS in a case that a UE radio capability identifier is not included in a UE context acquired from the second network node, or the first network node may learn from network configuration information that the second network node does not support RACS.

Optionally, the method may further include:

receiving a fourth radio capability identifier sent by the terminal device; and the sending a third radio capability identifier to a terminal device in a case that the terminal device supports RACS and a second network node does not support RACS includes:

sending the third radio capability identifier to the terminal device if the fourth radio capability identifier does not match the current radio capability of the terminal device in a case that the terminal device supports RACS and the second network node does not support RACS.

In this embodiment, the fourth radio capability identifier may be used for indicating a radio capability of the terminal device. In a case that the fourth radio capability identifier does not match the current radio capability of the terminal device, the first network node sends the third radio capability identifier to the terminal device, or otherwise, the first network node may not send the third radio capability identifier to the terminal device. Whereby, not only the consistency between the terminal device radio capability identifiers on the terminal device side and the first network node side can be ensured, but also resources can be saved.

Optionally, the receiving a fourth radio capability identifier sent by the terminal device may include:
receiving the fourth radio capability identifier sent by the terminal device in a fourth information,
where the fourth information includes one of: a registration request message or a security mode complete message.

In this embodiment, the third message may correspond to the fourth information. For example, if the fourth message is a registration request message, the third message may be a registration accept message; if the fourth message is a security mode complete message, the third message may be a TAU accept message.

In this embodiment, the first network node sends the fourth radio capability identifier in the registration request message or the security mode complete message, which can save signaling and resources.

Optionally, before the receiving a fourth radio capability identifier sent by the terminal device, the method further includes:
sending a security mode command carrying a UE radio capability identifier request information element to the terminal device.

In this embodiment, the first network node may carry a UE Radio Capability ID Request IE in a Security Mode Command message and send same to the UE, and the UE may send a UE radio capability identifier to the first network node in a case that the Security Mode Command carrying the UE Radio Capability ID Request IE is received. Whereby, the security of sending the UE radio capability identifier can be improved.

The embodiments of the present disclosure are described below with reference to examples:

Example 1

Application in 5G mobile communication system.

Manner 1: A UE supporting RACS may carry a currently available UE radio capability ID in a registration request message in a case that the UE satisfies the following network node change-related condition.

The network node change-related condition may include at least one of the following:
the UE moves out of a current TA List;
the UE is in a registration request process triggered by Intersystem Change;
the UE selects a new PLMN; or
a configuration update command message received by the UE from the network node carries a registration request bit with a value of 1.

Manner 2: A UE supporting RACS may carry a currently available UE radio capability ID in a registration request message each time the UE initiates a registration update process.

Example 2

Application in 5G system, or application when moving from MME to AMF.

In a registration update process where AMF Change (i.e., AMF change) occurs, if a UE supports RACS and a UE context acquired from a source-side network node (or referred to as an old network node) does not include a radio capability ID of the UE, a target AMF supporting RACS carries a UE radio capability ID that is allocated to the UE and matches the current radio capability of the UE in a registration update accept message.

The current radio capability of the UE may be acquired from a source AMF, or may be acquired from a next generation-radio access network (NG-RAN).

Example 3

Application in Long Term Evolution (LTE) mobile communication system, or application when moving from MME to AMF.

In a TAU process where MME Change (i.e., MME change) occurs, if a UE supports RACS and a UE context acquired from a source-side network node (or referred to as an old network node) does not include a radio capability ID of the UE, a target MME supporting RACS initiates a SECURITY MODE COMMAND process and carries a UE Radio Capability ID Request IE in the SECURITY MODE COMMAND.

In this way, the UE may send a UE radio capability ID to the target MME in a case that the SECURITY MODE COMMAND carrying the UE Radio Capability ID Request IE is received. The target MME supporting RACS carries a UE radio capability ID that is allocated to the UE and matches the current radio capability of the UE in a TAU accept message.

Figure 4:
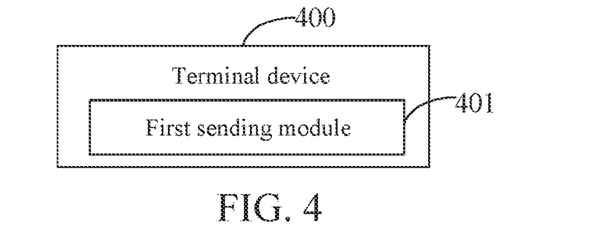
FIG. 4 is a structural diagram of a terminal device according to an embodiment of the present disclosure.

Referring to FIG. 4, FIG. 4 is a structural diagram of a terminal device according to an embodiment of the present disclosure. The terminal device supports RACS. As shown in FIG. 4, the terminal device 400 includes:
a sending module 401, configured to send a currently available first radio capability identifier of a terminal device to a network node in a case that a network node change-related condition is satisfied.

Optionally, the sending module is further configured to:
send the currently available first radio capability identifier of the terminal device to the network node in a first message,
where the first message includes one of: a registration request message or a security mode complete message.

Optionally, the network node change-related condition includes at least one of the following:
the terminal device moves out of a current tracking area list;
the terminal device performs an inter-system change;
the terminal device selects a new public land mobile network PLMN;
a configuration update command message received by the terminal device from the network node carries a registration request bit with a value of 1;
a security mode command received from the network node carries a UE radio capability identifier request information element; or
the terminal device initiates a registration update process.

Optionally, the terminal device further includes:
a receiving module, configured to receive a second radio capability identifier sent by the network node, after the currently available first radio capability identifier of the terminal device is sent to the network node,
where the second radio capability identifier matches a current radio capability of the terminal device.

Optionally, the receiving module is further configured to:
receive the second radio capability identifier sent by the network node in a second message, where the second message includes one of the following:
a registration accept message or a tracking area update TAU accept message.

Optionally, the second radio capability identifier is a radio capability identifier acquired by querying a UE capability management function UCMF node.

Optionally, the receiving module is further configured to:
receive the second radio capability identifier sent by the network node, in a case that the first radio capability identifier does not match the current radio capability of the terminal device.

The terminal device 400 provided in the embodiments of the present disclosure can implement the processes implemented by the terminal device in the foregoing method embodiments, which will not be described in detail herein again to avoid repetition.

In the terminal device 400 according to the embodiments of the present disclosure, the sending module 401 is configured to send a currently available first radio capability identifier of a terminal device to a network node in a case that a network node change-related condition is satisfied. Whereby, the problem of a mismatch between UE radio capability identifiers on the UE side and the network node side when the UE moves between a network node not supporting RACS and a network node supporting RACS can be solved, thereby ensuring normal communication between the UE and the network node.

Figure 5:
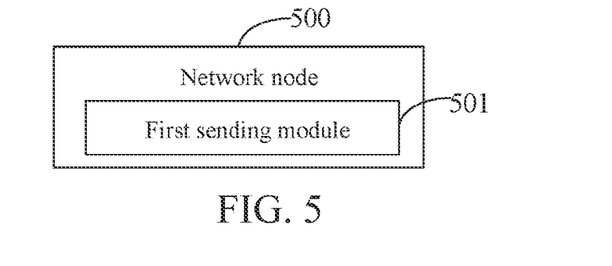
FIG. 5 is a structural diagram of a first network node according to an embodiment of the present disclosure.

Referring to FIG. 5, FIG. 5 is a structural diagram of a network node according to an embodiment of the present disclosure. The network node is a first network node, and the first network node supports RACS. As shown in FIG. 5, the network node 500 includes:

a first sending module 501, configured to send a third radio capability identifier to a terminal device in a case that the terminal device supports RACS and a second network node does not support RACS,
where the third radio capability identifier matches a current radio capability of the terminal device.

Optionally, the first sending module is further configured to:
send the third radio capability identifier to the terminal device in a third message,
where the third message includes one of: a registration accept message or a tracking area update TAU accept message.

Optionally, the third radio capability identifier is a radio capability identifier acquired by querying a UE capability management function UCMF node.

Optionally, a condition for determining that the second network node does not support RACS includes at least one of the following:
a radio capability identifier of the terminal device is not included in a context, where the context is a context of the terminal device acquired from the second network node; or
the first network node determines, based on network configuration information, that the second network node does not support RACS.

Optionally, the first network node further includes:
a receiving module, configured to receive a fourth radio capability identifier sent by the terminal device; and
the first sending module is further configured to:
send the third radio capability identifier to the terminal device if the fourth radio capability identifier does not match the current radio capability of the terminal device in a case that the terminal device supports RACS and the second network node does not support RACS.

Optionally, the receiving module is further configured to:
receive the fourth radio capability identifier sent by the terminal device in a fourth information,
where the fourth information includes one of: a registration request message or a security mode complete message.

Optionally, the first network node further includes:
a second sending module, configured to send a security mode command carrying a UE radio capability identifier request information element to the terminal device before the fourth radio capability identifier sent by the terminal device is received.

The network node 500 provided in the embodiments of the present disclosure can implement the processes implemented by the first network node in the foregoing method embodiments, which will not be described in detail herein again to avoid repetition.

In the network node 500 according to the embodiments of the present disclosure, the first sending module 501 is configured to send a third radio capability identifier to a terminal device in a case that the terminal device supports RACS and a second network node does not support RACS, where the third radio capability identifier matches a current radio capability of the terminal device. Whereby, the problem of mismatch between UE radio capability identifiers on the UE side and the network node side when the UE moves between a network node not supporting RACS and a network node supporting RACS can be alleviated, thereby improving the communication performance between the UE and the network node.

Figure 6:
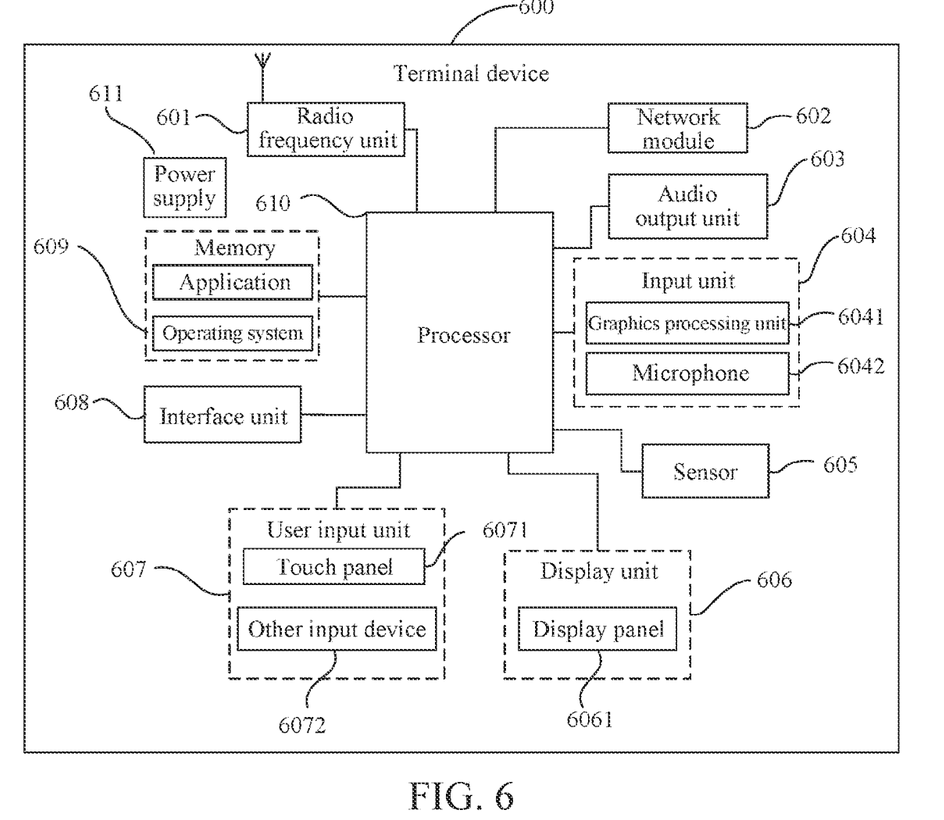
FIG. 6 is a structural diagram of a terminal device according to another embodiment of the present disclosure.

FIG. 6 is a structural diagram of another terminal device according to an embodiment of the present disclosure. The terminal device supports RACS. Referring to FIG. 6, the terminal device 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the terminal device shown in FIG. 6 is not intended to limit the terminal device, and the terminal device may include more components or fewer components than those shown in the figure, or some components may be combined, or a different component deployment may be used. In the embodiments of the present disclosure, the terminal device includes but is not limited to a mobile phone, a tablet computer, a notebook computer, a handheld computer, an in-vehicle terminal, a wearable device, and a pedometer.

The radio frequency unit 601 is configured to send a currently available first radio capability identifier of a terminal device to a network node in a case that a network node change-related condition is satisfied.

In the embodiments of the present disclosure, by sending a currently available first radio capability identifier of a terminal device to a network node in a case that a network node change-related condition is satisfied, the problem of a mismatch between UE radio capability identifiers on the UE side and the network node side when the UE moves between a network node not supporting RACS and a network node supporting RACS can be alleviated, thereby improving the communication performance between the UE and the network node.

Optionally, the radio frequency unit 601 is further configured to:

send the currently available first radio capability identifier of the terminal device to the network node in a first message, where the first message includes one of the following: a registration request message or a security mode complete message.

Optionally, the network node change-related condition includes at least one of the following:

the terminal device moves out of a current tracking area list;

the terminal device performs an inter-system change;

the terminal device selects a new public land mobile network PLMN;

a configuration update command message received by the terminal device from the network node carries a registration request bit with a value of 1;

a security mode command received from the network node carries a UE radio capability identifier request information element; or the terminal device initiates a registration update process.

Optionally, the radio frequency unit 601 is further configured to:

receive a second radio capability identifier sent by the network node, after the currently available first radio capability identifier of the terminal device is sent to the network node, where the second radio capability identifier matches a current radio capability of the terminal device.

Optionally, the radio frequency unit 601 is further configured to:

receive the second radio capability identifier sent by the network node in a second message, where the second message includes one of: a registration accept message or a tracking area update TAU accept message.

Optionally, the second radio capability identifier is a radio capability identifier acquired by querying a UE capability management function UCMF node.

Optionally, the radio frequency unit 601 is further configured to:

receive the second radio capability identifier sent by the network node, in a case that the first radio capability identifier does not match the current radio capability of the terminal device.

It should be understood that, in this embodiment of the present disclosure, the radio frequency unit 601 may be configured to receive and send a signal during an information receiving and sending process or a call process. Specifically, the radio frequency unit receives downlink data from a base station, then delivers the downlink information to the processor 610 for processing, and sends related uplink data to the base station. Generally, the radio frequency unit 601 includes, but is not limited to, an antenna, at least one amplifier, a transceiver, a coupler, a low noise amplifier, a duplexer, and the like. In addition, the radio frequency circuit 102 may further communicate with another device through wireless communication. In addition, the radio frequency unit 601 may further communicate with the network and another device through wireless communication.

The terminal device provides the user with wireless broadband Internet access through a network module 602, such as helping the user to send and receive emails, browse web pages, and access streaming media.

An audio output unit 603 may convert audio data received by the radio frequency unit 601 or the network module 602 or stored in a memory 609 into an audio signal and output as sound. In addition, the audio output unit 603 may further provide an audio output that is related to a particular function executed by the terminal device 600 (for example, a call signal receiving sound or a message receiving sound). The audio output unit 603 includes a loudspeaker, a buzzer, a receiver, and the like.

An input unit 604 is configured to receive an audio signal or a video signal. The input unit 604 may include a graphics processing unit (GPU) 6041 and a microphone 6042. The graphics processing unit 6041 performs processing on image data of a static picture or a video that is obtained by an image acquisition device (for example, a camera) in a video acquisition mode or an image acquisition mode. An image frame that has been processed may be displayed on a display unit 606. An image frame that has been processed by the graphics processing unit 6041 may be stored in the memory 609 (or another storage medium) or sent by using the radio frequency unit 601 or the network module 602. The microphone 6042 can receive sound and can process such sound into audio data. The processed audio data may be transferred, in a phone talk mode, to a format that may be sent to a mobile communication base station via the radio frequency unit 601 to output.

The terminal device 600 may further include at least one sensor 605, such as an optical sensor, a motion sensor, and other sensors. Specifically, the optical sensor includes an ambient light sensor and a proximity sensor. The ambient light sensor can adjust luminance of the display panel 6061 according to brightness of the ambient light. The proximity sensor may switch off the display panel 6061 and/or backlight when the terminal device 600 is moved to the ear. As one type of motion sensor, an acceleration sensor may detect magnitude of accelerations in various directions (which generally are triaxial), may detect magnitude and a direction of the gravity when static, and may be configured to identify a terminal device attitude (such as switchover between horizontal and vertical screens, a related game, and attitude calibration of a magnetometer), a related function of vibration identification (such as a pedometer and a knock); and the sensor 605 may further include a fingerprint sensor, a pressure sensor, an iris sensor, a molecular sensor, a gyroscope, a barometer, a hygrometer, a thermometer, an infrared sensor, etc., which are not be repeated herein.

A display unit 606 is configured to display information input by the user or information provided for the user. The display unit 606 may include a display panel 6061. The display panel 6061 may be configured by using a liquid crystal display (LCD), an organic light-emitting diode (OLED), or the like.

A user input unit 607 may be configured to: receive input digit or character information, and generate a keyboard signal input related to a user setting and function control of the terminal device. Specifically, the user input unit 607 includes a touch panel 6071 and another input device 6072. The touch panel 6071, also referred to as a touchscreen, may collect a touch operation of a user on or near the touch panel (such as an operation of a user on or near the touch panel 6071 by using any suitable object or attachment, such as a finger or a touch pen). The touch panel 6071 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 610. Moreover, the touch controller may receive and execute a command transmitted from the processor 610. In addition, the touch panel 6071 may be implemented by using various types, such as a resistive type, a capacitance type, an infrared type, and a surface acoustic wave type. In addition to the touch panel 6071, the user input unit 607 may further include the another input device 6072. Specifically, the another input device 6072 may include, but is not limited to, a physical keyboard, a functional key (such as a volume control key or a switch key), a track ball, a mouse, and a joystick, which are not repeated herein.

Further, the touch panel 6071 may cover the display panel 6061. After detecting a touch operation on or near the touch panel 6071, the touch panel transfers the touch operation to the processor 610, to determine a type of a touch event. Then, the processor 610 provides a corresponding visual output on the display panel 6061 according to the type of the touch event. In FIG. 6, the touch panel 6071 and the display panel 6061 implement, as two independent parts, input and output functions of the terminal device. However, in some embodiments, the touch panel 6071 and the display panel 6061 may be integrated to implement the input and output functions of the terminal device, which is not specifically limited herein.

An interface unit 608 is an interface for connecting an external device to the terminal device 600. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 608 may be configured to receive an input (for example, data information or power) from an external apparatus, and transmit the received input to one or more elements in the terminal device 600, or may be configured to transmit data between the terminal device 600 and the external apparatus.

The memory 609 may be configured to store a software program and various data. The memory 609 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 609 may include a high-speed random access memory, and may also include a nonvolatile memory, for example, at least one magnetic disk storage device, a flash memory, or another volatile solid-state storage device.

A processor 610 is the control center of the terminal device, and is connected to various parts of the terminal device by using various interfaces and lines. By running or executing the software program and/or module stored in the memory 609, and invoking data stored in the memory 609, the processor 610 performs various functions and data processing of the terminal device, thereby performing overall monitoring on the terminal device. The processor 610 may include one or more processing units; and optionally, the processor 610 may integrate an application processor and a modem processor. The application processor mainly processes an operating system, a user interface, an application program, and the like. The modem processor mainly processes wireless communication. It may be understood that, the modem processor may alternatively not be integrated in the processor 610.

The terminal device 600 may further include the power supply 611 (such as a battery) for supplying power to the components. Optionally, the power supply 611 may be logically connected to the processor 610 by using a power management system, thereby implementing functions, such as charging, discharging, and power consumption management, by using the power management system.

In addition, the terminal device 600 includes some unshown functional modules, which is not repeated herein.

Optionally, the embodiments of the present disclosure further provide a terminal device, including a processor 610, a memory 609, a computer program stored in the memory 609 and a computer program stored in the memory 609 and running on the processor 610. When the computer program is executed by the processor 610, each process of the foregoing embodiments of the radio capability identifier transmission method can be achieved, and the same technical effect can be achieved. In order to avoid repetition, details are not repeated herein.

Figure 7:
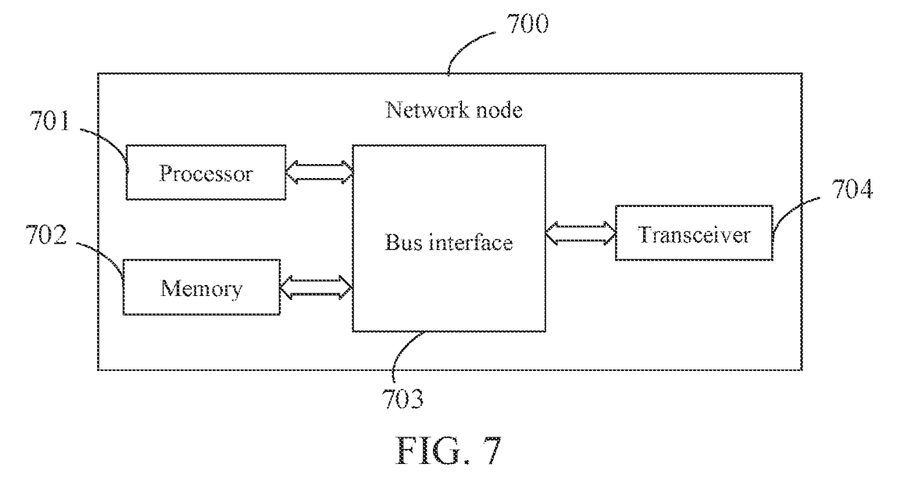
FIG. 7 is a structural diagram of a first network node according to another embodiment of the present disclosure.

Referring to FIG. 7, FIG. 7 is a structural diagram of a network node according to another embodiment of the present disclosure. The network node is a first network node, and the first network node supports RACS. As shown in FIG. 7, the network node 700 includes: a processor 701, a memory 702, a bus interface 703, and a transceiver 704. The processor 701, the memory 702, and the transceiver 704 are all connected to the bus interface 703.

In an embodiment of the present disclosure, the network node 700 further includes: a computer program stored in the memory 702 and executable by the processor 701.

In an embodiment of the present disclosure, the transceiver 704 is configured to:
send a third radio capability identifier to a terminal device in a case that the terminal device supports RACS and a second network node does not support RACS,
where the third radio capability identifier matches a current radio capability of the terminal device.

Optionally, the transceiver 704 is further configured to:
send the third radio capability identifier to the terminal device in a third message,
where the third message includes one of: a registration accept message or a tracking area update TAU accept message.

Optionally, the third radio capability identifier is a radio capability identifier acquired by querying a UE capability management function UCMF node.

Optionally, a condition for determining that the second network node does not support RACS includes at least one of the following:
a radio capability identifier of the terminal device is not included in a context, where the context is a context of the terminal device acquired from the second network node; or
the first network node determines, based on network configuration information, that the second network node does not support RACS.

Optionally, the transceiver 704 is further configured to:
receive a fourth radio capability identifier sent by the terminal device; and
the sending a third radio capability identifier to a terminal device in a case that the terminal device supports RACS and a second network node does not support RACS includes:
sending the third radio capability identifier to the terminal device if the fourth radio capability identifier does not match the current radio capability of the terminal device in a case that the terminal device supports RACS and the second network node does not support RACS.

Optionally, the transceiver 704 is further configured to:
receive the fourth radio capability identifier sent by the terminal device in a fourth information,
where the fourth information includes one of: a registration request message or a security mode complete message.

Optionally, the transceiver 704 is further configured to:
send a security mode command carrying a UE radio capability identifier request information element to the terminal device before receiving the fourth radio capability identifier sent by the terminal device.

An embodiment of this specification further provides a computer-readable storage medium, storing a computer program, where the computer program, when executed by a processor, implements each process of the foregoing embodiments of the radio capability identifier transmission method, and the same technical effect can be achieved. To avoid repetition, details are not repeated herein. The computer-readable storage medium may include a flash drive, a read-only memory (ROM), a random access memory (RAM), a magnetic disk, or an optical disc.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the related technology may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of present disclosure.

The embodiments of the present disclosure are described above with reference to the accompanying drawings, but the present disclosure is not limited to the foregoing specific embodiments, which are merely illustrative rather than limited. Under the inspiration of the present disclosure, a person of ordinary skill in the art can make many forms without departing from the scope of the present disclosure and the protection of the claims, all of which fall within the protection of the present disclosure.

What is claimed is:

1. A method for transmitting a radio capability identifier, applicable to a terminal device, wherein the terminal device supports radio capability signaling optimization RACS, the method comprising:
sending a currently available first radio capability identifier of a terminal device to a first network node, in a case that a network node change-related condition is satisfied;
wherein the network node change-related condition comprises: a security mode command carries a UE radio capability identifier request information element, the security mode command being sent by the first network node in a case that the terminal device supports RACS and a second network node does not support RACS;
a condition for determining that the second network node does not support RACS comprises:
a radio capability identifier of the terminal device is not contained in a context, wherein the context is a context of the terminal device acquired from the second network node;
wherein the first network node is a network node after the terminal moves and the second network node is a network node before the terminal moves; and
wherein the first network node comprises a Mobility Management Entity (MME).

2. The method according to claim 1, wherein the sending a currently available first radio capability identifier of a terminal device to a first network node comprises:
sending the currently available first radio capability identifier of the terminal device to the first network node in a first message,
wherein the first message includes one of: a registration request message or a security mode complete message.

3. The method according to claim 1, wherein the network node change-related condition further comprises at least one of the following:
the terminal device moves out of a current tracking area list;
the terminal device performs an inter-system change;
the terminal device selects a new public land mobile network PLMN;
a configuration update command message received by the terminal device from the first network node carries a registration request bit with a value of 1;
or
the terminal device initiates a registration update process.

4. The method according to claim 1, wherein after the sending a currently available first radio capability identifier of a terminal device to a first network node, the method further comprises:
receiving a second radio capability identifier sent by the first network node,
wherein the second radio capability identifier matches a current radio capability of the terminal device.

5. The method according to claim 4, wherein the receiving a second radio capability identifier sent by the first network node comprises:
receiving the second radio capability identifier sent by the first network node in a second message,
wherein the second message comprises one of: a registration accept message or a tracking area update TAU accept message.

6. The method according to claim 4, wherein the second radio capability identifier is a radio capability identifier acquired by querying a UE capability management function UCMF node.

7. The method according to claim 4, wherein the receiving a second radio capability identifier sent by the first network node comprises:
receiving the second radio capability identifier sent by the first network node, in a case that the first radio capability identifier does not match the current radio capability of the terminal device.

8. A method for transmitting a radio capability identifier, applicable to a network node, wherein the network node is a first network node, and the first network node supports RACS, the method comprising:

sending a third radio capability identifier to a terminal device in a case that the terminal device supports RACS and a second network node does not support RACS,
wherein the third radio capability identifier matches a current radio capability of the terminal device;
wherein the method further comprises:
receiving a fourth radio capability identifier sent by the terminal device; and
the sending a third radio capability identifier to a terminal device in a case that the terminal device supports RACS and a second network node does not support RACS includes:
sending the third radio capability identifier to the terminal device, if the fourth radio capability identifier does not match the current radio capability of the terminal device, in a case that the terminal device supports RACS and the second network node does not support RACS.

9. The method according to claim 8, wherein the sending a third radio capability identifier to a terminal device comprises:
sending the third radio capability identifier to the terminal device in a third message,
wherein the third message comprises one of: a registration accept message or a tracking area update TAU accept message.

10. The method according to claim 8, wherein the third radio capability identifier is a radio capability identifier acquired by querying a UE capability management function UCMF node.

11. The method according to claim 8, wherein a condition for determining that the second network node does not support RACS comprises at least one of the following:
a radio capability identifier of the terminal device is not contained in a context, wherein the context is a context of the terminal device acquired from the second network node; or
the first network node determines, based on network configuration information, that the second network node does not support RACS.

12. The method according to claim 8, wherein the receiving a fourth radio capability identifier sent by the terminal device comprises:
receiving the fourth radio capability identifier sent by the terminal device in a fourth information,
wherein the fourth information comprises one of: a registration request message or a security mode complete message.

13. The method according to claim 8, wherein before the receiving a fourth radio capability identifier sent by the terminal device, the method further comprises:
sending a security mode command carrying a UE radio capability identifier request information element to the terminal device.

14. The method according to claim 8, wherein a condition for determining that the second network node does not support RACS comprises:
a radio capability identifier of the terminal device is not contained in a context, wherein the context is a context of the terminal device acquired from the second network node;
wherein the first network node is a network node after the terminal moves and the second network node is a network node before the terminal moves; and
wherein the network node comprises a Mobility Management Entity (MME).

15. A terminal device, comprising a processor, a memory, and a computer program stored in the memory and executable by the processor, wherein the computer program, when executed by the processor, implements:
sending a currently available first radio capability identifier of a terminal device to a first network node, in a case that a network node change-related condition is satisfied, wherein the terminal device supports radio capability signaling optimization RACS;
wherein the network node change-related condition comprises: a security mode command carries a UE radio capability identifier request information element, the security mode command being sent by the first network node in a case that the terminal device supports RACS and a second network node does not support RACS;
a condition for determining that the second network node does not support RACS comprises:
a radio capability identifier of the terminal device is not contained in a context, wherein the context is a context of the terminal device acquired from the second network node;
wherein the first network node is a network node after the terminal moves and the second network node is a network node before the terminal moves; and
wherein the first network node comprises a Mobility Management Entity (MME).

16. The terminal device according to claim 15, wherein the sending a currently available first radio capability identifier of a terminal device to a first network node comprises:
sending the currently available first radio capability identifier of the terminal device to the first network node in a first message,
wherein the first message includes one of: a registration request message or a security mode complete message.

17. The terminal device according to claim 15, wherein the network node change-related condition further comprises at least one of the following:
the terminal device moves out of a current tracking area list;
the terminal device performs an inter-system change;
the terminal device selects a new public land mobile network PLMN;
a configuration update command message received by the terminal device from the first network node carries a registration request bit with a value of 1;
or
the terminal device initiates a registration update process.

18. The terminal device according to claim 15, wherein the computer program, when executed by the processor, further implements:
after the sending a currently available first radio capability identifier of a terminal device to a first network node, receiving a second radio capability identifier sent by the first network node;
wherein the second radio capability identifier matches a current radio capability of the terminal device.

19. The terminal device according to claim 18, wherein the receiving a second radio capability identifier sent by the first network node comprises:
receiving the second radio capability identifier sent by the first network node in a second message,
wherein the second message comprises one of: a registration accept message or a tracking area update TAU accept message;
or wherein the second radio capability identifier is a radio capability identifier acquired by querying a UE capability management function UCMF node;

or wherein the receiving a second radio capability identifier sent by the first network node comprises:
receiving the second radio capability identifier sent by the first network node, in a case that the first radio capability identifier does not match the current radio capability of the terminal device.

20. The terminal device according to claim 18, wherein the receiving a second radio capability identifier sent by the first network node comprises:
receiving the second radio capability identifier sent by the first network node, in a case that the first radio capability identifier does not match the current radio capability of the terminal device.

\* \* \* \* \*